United States Patent
Weiss et al.

(10) Patent No.: US 8,866,703 B2
(45) Date of Patent: Oct. 21, 2014

(54) PERSISTENCE-OF-VISION DISPLAY WITH STYLUS INPUT DEVICE

(71) Applicant: Crayola LLC, Easton, PA (US)

(72) Inventors: Stephen Weiss, Easton, PA (US); Gregory R. Nungester, Asbury, NJ (US)

(73) Assignee: Crayola LLC, Easton, PA (US)

( * ) Notice: Subject to any disclaimer, the term of this patent is extended or adjusted under 35 U.S.C. 154(b) by 105 days.

(21) Appl. No.: 13/781,028

(22) Filed: Feb. 28, 2013

(65) Prior Publication Data

US 2013/0229392 A1     Sep. 5, 2013

Related U.S. Application Data

(60) Provisional application No. 61/605,556, filed on Mar. 1, 2012.

(51) Int. Cl.
| | |
|---|---|
| *G09G 3/00* | (2006.01) |
| *G06F 3/038* | (2013.01) |
| *G09F 9/33* | (2006.01) |
| *G06F 3/042* | (2006.01) |
| *G06F 3/041* | (2006.01) |
| *G06F 3/0354* | (2013.01) |

(52) U.S. Cl.
CPC .......... *G06F 3/03545* (2013.01); *G06F 3/0386* (2013.01); *G09F 9/33* (2013.01); *G06F 3/042* (2013.01); *G06F 3/0412* (2013.01); *G09G 3/005* (2013.01)
USPC ............................................ 345/31; 345/183

(58) Field of Classification Search
CPC .... G09G 3/005; G06F 3/03545; G06F 3/0383
USPC ............................................ 345/31, 180–183
See application file for complete search history.

(56) References Cited

U.S. PATENT DOCUMENTS

| | | | |
|---|---|---|---|
| 4,160,973 | A | 7/1979 | Berlin |
| 4,298,868 | A | 11/1981 | Spurgeon |
| 4,689,604 | A | 8/1987 | Sokol |
| 4,836,670 | A | 6/1989 | Hutchinson |
| 4,915,666 | A | 4/1990 | Maleyko |
| 5,057,827 | A | 10/1991 | Nobile |
| 5,190,491 | A | 3/1993 | Connelly |
| 5,302,965 | A | 4/1994 | Belcher |
| 5,406,300 | A | 4/1995 | Takimoto |
| 5,748,157 | A | 5/1998 | Eason |
| 5,791,966 | A | 8/1998 | Capps |
| 6,055,098 | A | 4/2000 | Lett |
| 6,085,112 | A | 7/2000 | Kleinschmidt |
| 6,115,006 | A | 9/2000 | Brotz |
| 6,265,984 | B1 | 7/2001 | Molinaroli |
| 6,278,419 | B1 | 8/2001 | Malkin |
| 6,404,409 | B1 | 6/2002 | Solomon |
| 6,492,963 | B1 | 12/2002 | Hoch |

(Continued)

*Primary Examiner* — Michael Pervan
(74) *Attorney, Agent, or Firm* — Shook, Hardy & Bacon L.L.P.

(57) ABSTRACT

A persistence-of-vision display device that is configured to receive inputs via a stylus and methods for its use are described. The device includes a display housing with a rotating armature disposed therein. The armature includes arrays of light sources and sensors. A stylus is provided that is useable to provide input through the display housing in a manner similar to drawing on the housing. Angular locations of the inputs are identified and corresponding light sources are illuminated. The impression of drawing on the display device is thus provided. Controls for color selection, animation, and other features are provided.

20 Claims, 8 Drawing Sheets

(56) References Cited

U.S. PATENT DOCUMENTS

| | | |
|---|---|---|
| 6,626,728 B2 | 9/2003 | Holt |
| 6,639,571 B2 | 10/2003 | Wang |
| 6,802,758 B2 | 10/2004 | Somers |
| 6,856,303 B2 | 2/2005 | Kowalewski |
| 6,882,117 B1 | 4/2005 | Hughes |
| 6,894,663 B1 | 5/2005 | Altman |
| 7,030,420 B2 | 4/2006 | Shimomura |
| 7,037,169 B2 | 5/2006 | Benedek |
| D522,587 S | 6/2006 | Yokoi |
| D526,026 S | 8/2006 | Watanable |
| D527,053 S | 8/2006 | Watababe |
| 7,099,701 B2 | 8/2006 | Lo |
| 7,142,173 B2 | 11/2006 | Bentley |
| 7,161,256 B2 | 1/2007 | Fang |
| 7,179,149 B2 | 2/2007 | Chernick |
| 7,183,939 B1 | 2/2007 | Lo |
| 7,236,146 B2 | 6/2007 | Smedley |
| D546,396 S | 7/2007 | Matsuno |
| 7,250,954 B2 | 7/2007 | Biegelsen |
| 7,271,813 B2 | 9/2007 | Gilbert |
| 7,397,387 B2 | 7/2008 | Suzuki |
| 7,477,208 B2 | 1/2009 | Matlock |
| 7,708,640 B2 | 5/2010 | Burak |
| 7,766,718 B2 | 8/2010 | Rago |
| 7,903,929 B2 | 3/2011 | Wernersson |
| D645,096 S | 9/2011 | Sledge |
| 2008/0186155 A1 | 8/2008 | Spencer |

PERSISTENCE-OF-VISION DISPLAY WITH STYLUS INPUT DEVICE

CROSS-REFERENCE TO RELATED APPLICATIONS

This application claims priority to U.S. Provisional Patent Application Ser. No. 61/605,556, filed Mar. 1, 2012, the disclosure of which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, persistence-of-vision display devices that are configured to receive input via a stylus to provide the impression of drawing on the persistence-of-vision display. A plurality of sensors is disposed on an armature along with a plurality of light sources that are useable to generate a persistence-of-vision display. Input from a stylus is coupled through a transparent or translucent housing to the sensors. The angular location of the inputs is identified and corresponding light sources are illuminated or strobed when they pass the identified angular location. Thereby, the path of the stylus along the housing is identified and the light sources are appropriately illuminated to depict the path.

DESCRIPTION OF THE DRAWINGS

Illustrative embodiments of the invention are described in detail below with reference to the attached drawing figures, and wherein.

DETAILED DESCRIPTION

Figure 1:
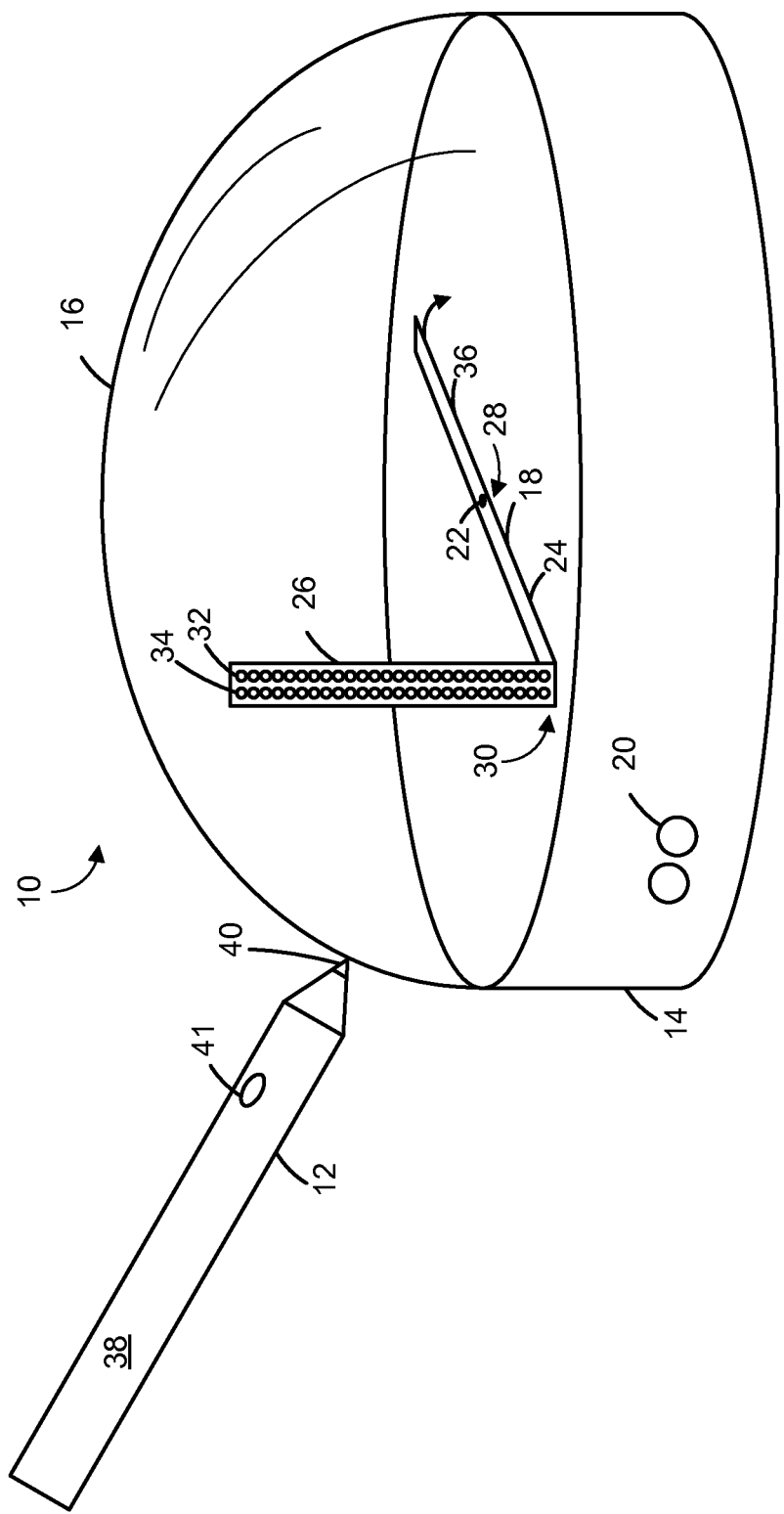
FIG. 1 is a perspective view of a persistence-of-vision display device in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention employ light displays that rely on the persistence-of-vision (POV) in the human eye. Many theories are proposed in the art for the actual mechanism through which POV is produced by the human brain and/or eyes. The particular mechanism is not critical for describing or understanding embodiments of the invention. It is thus not described in depth herein. But POV is generally understood to comprise the persistence of an image seen by an observer for a small duration of time, e.g. $\frac{1}{25}^{th}$ of a second. For example, a light source that is strobed or flashed appears to a user to remain visible for that small duration of time even though the light may not actually remain on for that duration. Thereby, a light source can be repeatedly strobed at a given location to create the appearance of the light remaining continuously on due to the persistence of the image of the light in the observer's vision.

With reference now to the figures, apparatus, methods, and systems for providing a persistence-of-vision display are described in accordance with embodiments of the invention. Various embodiments are described with respect to the figures in which like elements are depicted with matching second and third digits of their reference numerals, e.g. second segment 26 is similar to second segments 326, 426, 526, and 626 except as described herein.

Figure 2:
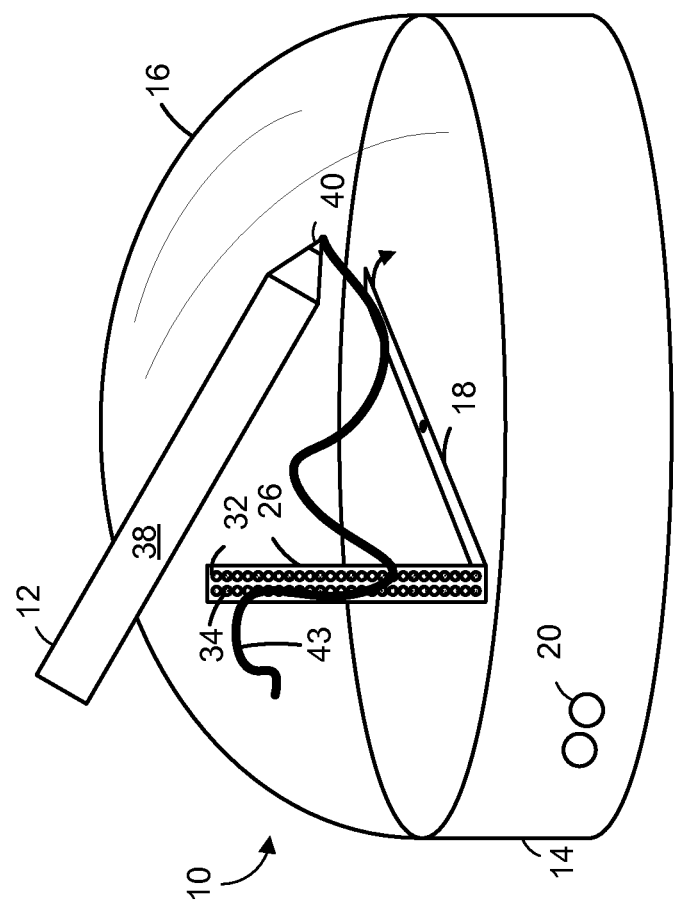
FIG. 2 is a perspective view of the persistence-of-vision display device of FIG. 1 displaying an image drawn via input from a stylus in accordance with an embodiment of the invention.

As depicted in FIGS. 1 and 2, embodiments of the invention include a POV display device 10, and a stylus input device 12. The POV display device 10 includes a base unit 14, a display housing 16, and an armature 18. The base unit 14 provides an enclosure within which a drive motor, control electronics, control features 20, and other desired components are disposed. The base unit 10 is configured in any shape, size, or form suitable to house those components disposed therein and to provide desired aesthetic characteristics. The base unit 10 may also include a power source such as one or more batteries or might include a power cord for connection to a standard electrical outlet.

The drive motor is configured to rotate a shaft 22 that is coupled to the armature 18. The shaft 22 is rotated directly by the drive motor or one or more gears might be employed between a drive shaft of the motor and the shaft 22. The drive motor comprises an electrical motor and is communicatively coupled to the control electronics. The drive motor might also be electrically coupled to a control feature 20, such as a switch, on the base unit 10 to enable operator control of the drive motor. In an embodiment, the control electronics and/or the control feature 20 controls the on/off state of the drive motor and/or the speed of the drive motor.

The control electronics include various electronic components, such as logic chips, memories, processors, integrated circuit boards, and the like that are useable to generate, store, and instruct displays of images by the display device 10 as more fully described below. The control electronics may include one or more integrated or removable memories that store pre-programmed images for display by the device 10. The control electronics might also include and be operable to execute logic, routines, or software for animating a pre-programmed image or an image received from a user. As discussed below, in some embodiments, the control electronics may receive an indication from a user regarding the display of a particular color of light, and may instruct a corresponding display of the particular color of light by the display device 10.

The control features 20 comprise any switches, buttons, knobs, or other features useable by an operator to change, adjust, or otherwise control characteristics of a displayed image. The control features 20 may also be useable to identify characteristics associated with inputs provided to the device 10 as described below. For example, a control feature 20 might comprise a knob by which an operator designates a color to be associated with provided inputs.

With continued reference to FIGS. 1 and 2, the display housing 16 comprises a transparent, semi-transparent, or translucent enclosure. The display housing 16 is configured to mate with the base unit 14 to enclose the armature 18 therein. In an embodiment the display housing 16 is fixedly coupled to the base unit 14. The display housing 16 includes a dome, cone, truncated cone, or other similar form. For example, in an embodiment depicted in FIG. 3, a display housing 316 has a truncated cone form. In embodiments, the display housing 16 has a smooth interior and exterior surface or includes facets on one or both of the interior and exterior surfaces. The display housing 16 is also configured to couple a signal, e.g. a light beam or other radiated energy, from the exterior surface into the interior of the display housing 16. In an embodiment, the display housing 16 includes one or more filters applied to a surface thereof or integrated therein. The filters might reduce noise from the environment that interferes with the signal.

Figure 3:
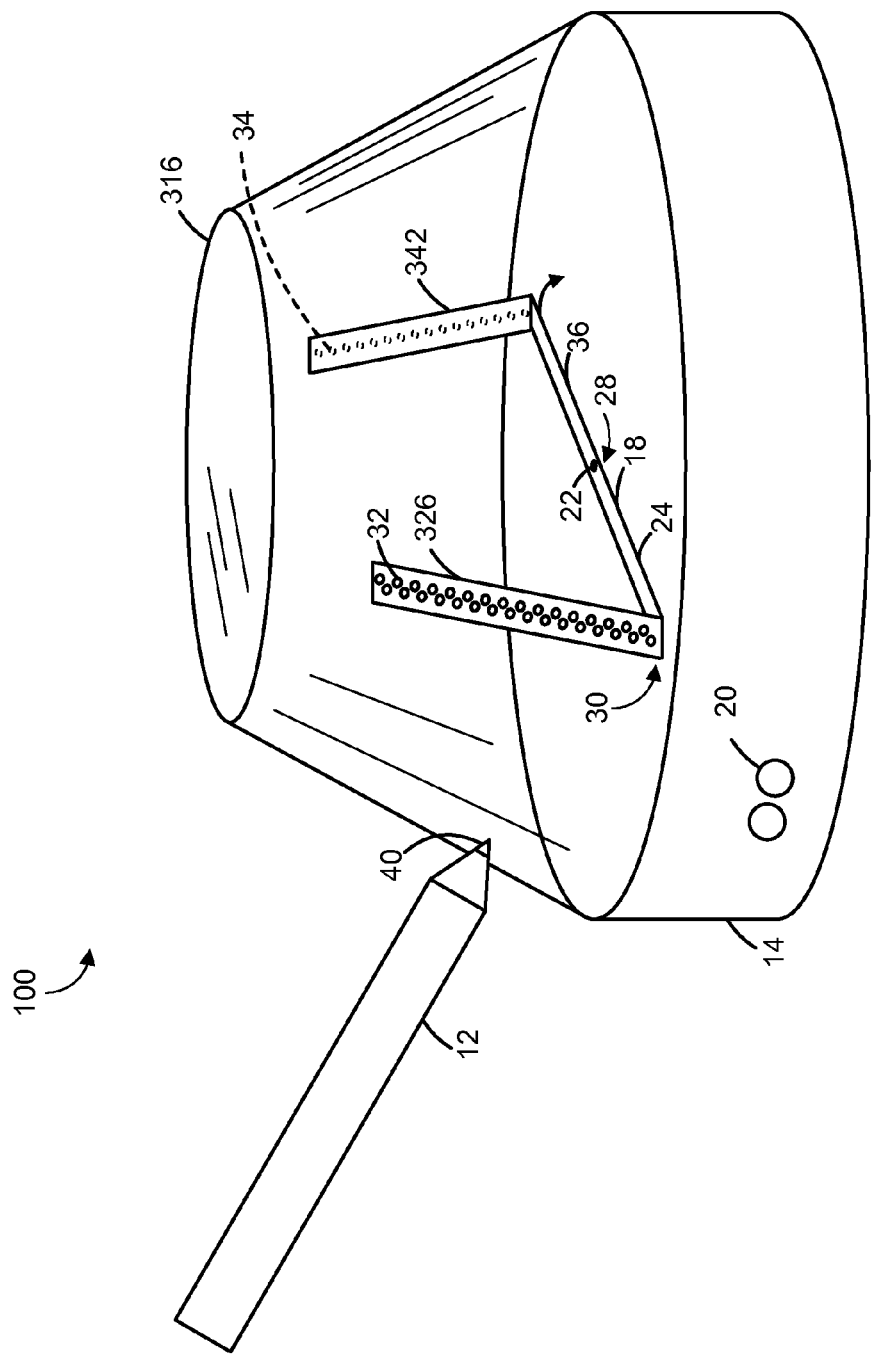
FIG. 3 is a perspective view of a persistence-of-vision display device having light sources and sensors disposed on diametrically opposed armature segments and a truncated cone-shaped display housing in accordance with an embodiment of the invention.

Embodiments of the armature 18 include at least a first segment 24 and a second segment 26. The first segment 24 is coupled to the shaft 22 at a first end 28 and extends generally perpendicularly to an axis of rotation of the shaft 22. The first segment 24 connects to the second segment 26 at a distal end 30 of the first segment 24. In an embodiment, the first segment 24 comprises a disc on which the second segment 26 is disposed. The second segment 26 extends at an angle from the first segment 24 in a direction away from the base unit 14. In an embodiment, the second segment 26 extends substantially perpendicular to the first segment 24. In another embodiment, a second segment 326 extends at an acute angle with respect to the first segment 24 to substantially follow an inward sloping surface of the truncated cone housing 316 as depicted in FIG. 3.

Figure 4:
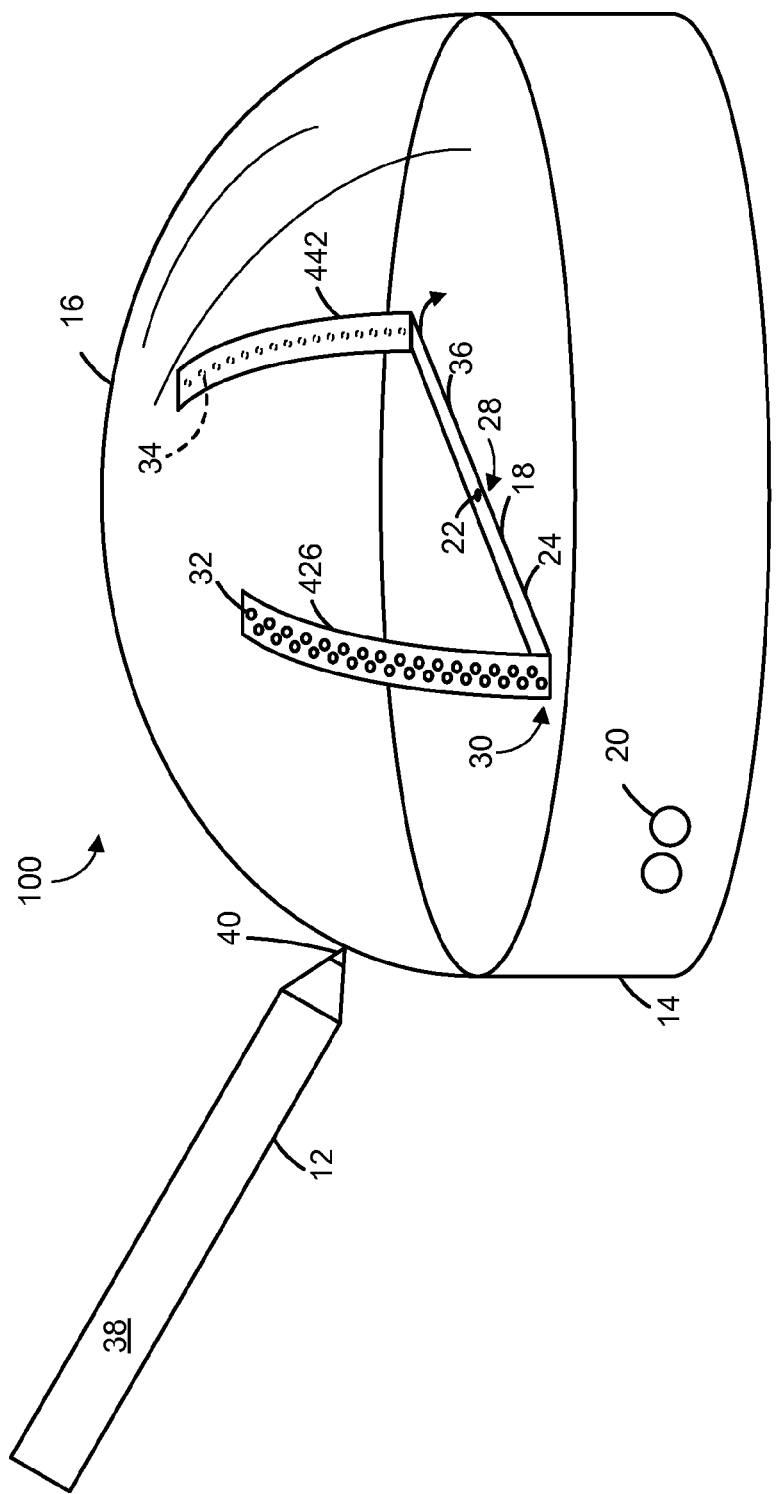
FIG. 4 is a perspective view of a persistence-of-vision display device having light sources and sensors disposed on diametrically opposed and curved armature segments in accordance with an embodiment of the invention.

The second segment 26 is typically a planar segment but, in embodiments, may curve or bend along its length. In an embodiment, the second segment 26 conforms to the shape of the display housing 16, e.g. the second segment 26 bends to follow a curved-shape of the display housing 16. For example, in an embodiment, a second segment 426 has a curved shape that substantially follows an inward curving surface of the housing 16 as depicted in FIG. 4. In another embodiment, the armature 18 includes a third segment 36 similar to the first segment 24 that extends opposite the first segment 24. The armature 18 might also include a fourth segment similar to the second segment 26 and connected to a distal end of the third segment 36. For example, as depicted in FIGS. 3 and 4, a fourth segment 342 or 442 that is diametrically opposed to second segments 326, 426 might be provided.

The second segment 26 includes a plurality of light sources 32 and a plurality of sensors 34 disposed on an outwardly facing surface of the second segment 26. In an embodiment, the light sources 32 are alternatively or additionally disposed on an inward facing surface of the second segment 26. The light sources 32 are viewable from a single side of the second segment 26 or might be viewable from a plurality of directions. The light sources 32 are arranged in a configuration extending along at least a portion of the length of the second segment 26. In an embodiment, the light sources 32 are arranged in one or more parallel columns. In another embodiment, the light sources 32 in a first column are offset with respect to light sources 32 in a second column as depicted in FIGS. 3-4. The light sources 32 include any available light emitting device technology, such as light emitting diodes (LEDs) or the like that can emit one or a plurality of colors or wavelengths of light.

The sensors 34 comprise any sensor technology available in the art. For example, the sensors might comprise charge coupled devices (CCD) or active pixel sensors like complimentary metal-oxide-semiconductor (CMOS) sensors. The sensors 34 are arranged in any desired configuration on the second segment 26. In an embodiment, the sensors 34 are arranged similarly to the light sources 32. In an embodiment, each sensor 34 corresponds to a light source 32. The corresponding sensor 34 and light source 32 might be similarly located along the length of the second segment 26.

Figure 5:
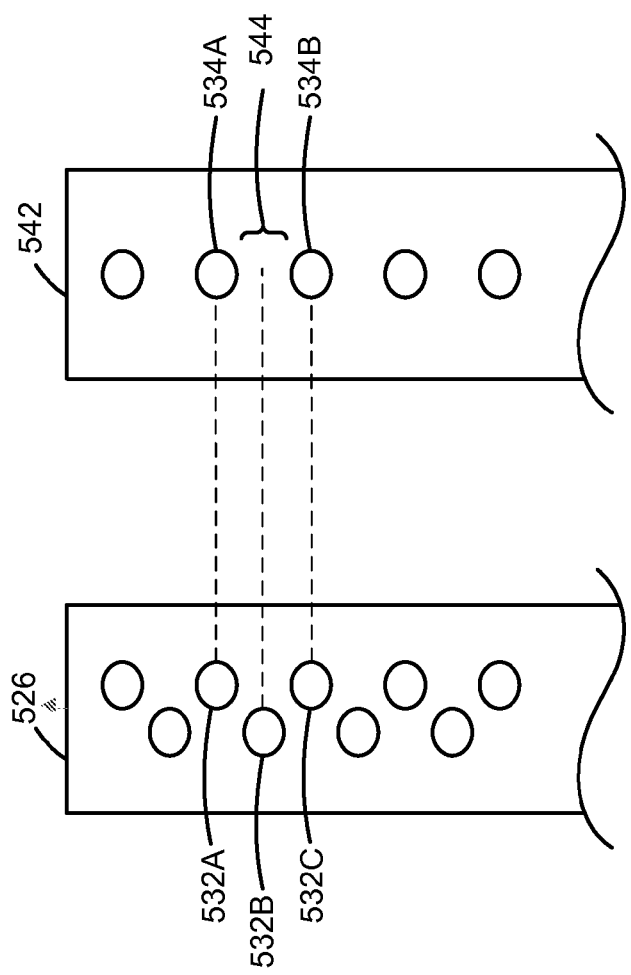
FIG. 5 illustrates a second segment and a fourth segment of an armature placed side-by-side and depicting an alignment of sensors and light sources thereon in accordance with an embodiment of the invention.

With additional reference to FIGS. 3-5, in another embodiment, the number of sensors 34 is half the number of light sources 32. For example, thirty-two light sources 32 might be employed while only sixteen sensors 34 are provided. As depicted in FIG. 5, the sensors 534A-B might be spaced apart such that each sensor 534A-B aligns with every second light source 532A, 532C and a space 544 between each pair of adjacent sensors 534A-B aligns with an intermediate light source 532B. And, as depicted in FIGS. 3-5, the sensors 34 might be disposed on the fourth segments 342, 442, and 542 of the armature 18.

In an embodiment, one or more components of the control electronics (not shown) are disposed on the armature 18. The control electronics components might be arranged and located on the armature 18 to counter balance the second segment 26, the light sources 32, and the sensors 34.

The stylus input device 12 comprises any stylus configuration and technology available in the art that is useable to provide a signal to the sensors 34 through the display housing 16. The stylus 12 includes a body 38 and a tip 40. The body 38 is configured similarly to that of a handheld writing device or in another desired configuration. The tip 40 is configured to emit the signal from the stylus 12. The tip 40 may be configured to focus the signal into a beam or cone transmission or to disperse the transmission. The stylus 12 might also include one or more control features 41 that are useable to adjust or alter the signal that is transmitted by the stylus 12. For example, in one embodiment, the stylus 12 may emit a signal from the tip 40 based on contacting the display housing 16. In another embodiment, a control feature 41 may be used to indicate when to transmit a signal from the stylus 12 to the display housing 16. For example, a user may activate the control feature 41 while pointing the tip 40 at the display housing 16 and holding the stylus 12 at a particular distance with respect to the display housing 16.

In an embodiment, the signal is a light transmission in a frequency or frequency band compatible with the sensors 34. The frequency or frequency band is in any portion of the light spectrum, e.g. infrared, visible, near-visible, ultraviolet, or the like. In an embodiment, the frequency or frequency band of the light transmission is selectable via the control features 41 on the stylus 12. In another embodiment, the signal comprises a radio frequency transmission or an ultrasonic transmission. The signal transmission might also be activated by the control features 41 on the stylus 12. The signal transmission is a continuous transmission or a pulsed transmission and might contain information encoded therein that is receivable by the sensors 34.

With continued reference to FIGS. 1 and 2, the operation of the POV display device 10 is described in accordance with an embodiment of the invention. Initially, the drive motor is energized via the one or more control features 20 on the base unit, e.g. a power switch is actuated. The drive motor rotates the shaft 22 which thereby, rotates the armature 18 within the display housing 16. At this point, one or more predetermined images that are stored in a memory of the control unit or in a removable memory that is communicatively coupled to the control unit might be displayed.

In an embodiment, to display an image, the rotation of the armature is broken down into a plurality of angular positions, and the location of the light sources 32 along the length of the second segment 26 of the armature 18 is identified. As such, a grid of pixel locations is determined that corresponds with the path swept out by the rotating armature 18. Pixel locations corresponding to the image to be displayed are identified and the corresponding light sources 32 are strobed or illuminated when they pass through those pixel locations. The light sources 32 might also be illuminated as they pass from one pixel location to another to create an elongated, illuminated strip rather than just a point or pixel of light. The rotational speed of the armature 18 is great enough and the light sources 32 are strobed at the pixel locations at a great enough frequency that the image appears continuously displayed within the display housing 16 due to the persistence-of-vision effect. The control electronics might also operate to alter the illuminated pixel locations such that the displayed image appears to move about the display housing 16 or to be animated. In an embodiment, the image might be provided to appear as a three-dimensional image.

Alternatively or in addition to displaying predetermined images, the display device 10 can receive inputs from the stylus 12 to provide the impression of drawing an image. The stylus 12 is energized, such as by actuating a power switch to begin emission of a signal from the tip 40. In an embodiment, a button or other control features is provided on the stylus 12 to selectively activate emission of the signal, e.g. a button is depressed when signal emission is desired and released to cease signal emissions.

In another embodiment, the signal can be altered via the one or more other control features 41 provided on the stylus 12. For example, a color-selection dial might be provided on the stylus 12 to allow a user to select a color of light to be emitted by the light sources 32 as a result of signals received from the stylus 12. The color-selection dial can alter the wavelength of the signal emitted by the stylus or can change data embedded in the signal. In another embodiment, signals regarding control features are communicated by the stylus 12 and received by the display device 10 via a communications route other than the sensors 34, e.g. a separate receiver might be provided in the base unit 14 to receive a second, separate signal from the stylus 12. The second signal can comprise the same or different type of signal as that provided to the sensors 34, e.g. light, RF, ultrasonic, or the like. In another embodiment, display characteristics, such as displayed light colors, are selected via the one or more control features 20 on the base unit 14.

The tip 40 of the stylus 12 is brought into contact or adjacent to the exterior surface of the display housing 16 and within the path of the armature 18. The signal emitted by the stylus 12 is coupled through the display housing 16 and is received by one or more of the sensors 34 corresponding to the location of the stylus 12 tip 40 along the length of the second segment 26 of the armature 18. The angular position of the received signal is identified. As such, pixel locations corresponding to the location of the stylus tip 40 are determined and the corresponding light sources 32 are appropriately illuminated at those locations.

In an embodiment, an algorithm or other process is completed to identify a particular pixel location associated with a received signal when a number of sensors 34 simultaneously receive the input signal. For example, a cluster of five sensors might receive the signal, but only the pixel location associated with the sensor 34 in the middle of the cluster or the sensor 34 that receives the signal at the greatest intensity is identified for illumination.

Similarly, in another embodiment, as depicted in FIGS. 3-5, in which half as many sensors 34 as light sources 32 are employed, an algorithm might be employed to determine an appropriate light source 32 to illuminate. For example, an input that is applied directly in line with a sensor 34A is identified to correspond with a light source 32A that is aligned with the sensor 34A. An input that is applied between a pair of adjacent sensors 34A-B in the space 544 is sensed by both sensors 34A-B but at a reduced intensity. An algorithm is thus used to determine whether the light source 32A, 32B, and/or 32C should be illuminated. For example, if both sensors 34A and 34B receive the signal at an equal or approximately equal intensity then it might be determined that the light source 32B is to be illuminated. Or if one of the sensors 34A-B receives the signal at a greater intensity then the sensor 34A-B that receives the greater intensity signal is illuminated. An algorithm might also indicate that more than one of the light sources 32A-C should be illuminated.

The tip 40 of the stylus 12 is moved across the exterior surface of the display housing 16 in a manner similar to drawing or painting a picture on the display housing 16. Additionally, the light sources 32 are selectively illuminated at the pixel locations corresponding with the strokes of the stylus 12 to display a created drawing image 43. In embodiments, drawing image 43 may be created by stylus 12 and depicted on display housing 16 in one of multiple different colors of light, as selected by a user. For example, a color selection indication may be received by the control unit that identifies a particular color of light to selectively illuminate the corresponding pixel locations. In one embodiment, a predetermined image stored in a memory of the control unit (or in a removable memory that is communicatively coupled to the control unit) might be displayed on the display housing 16, providing one or more selection options for a color and/or width of drawing line for creating the drawing image 43 using the stylus 12.

For example, a user may select from one of multiple color options from the selection options illuminated on display housing 16 using the stylus 12 to indicate a particular color. Upon selecting a particular color from the selection options, a user may draw on the display housing 16 to produce the corresponding, selected color of light. In other words, light sources 32 may be selectively illuminated at the pixel locations corresponding with the strokes of the stylus 12, to display a created drawing image 43 in the selected color of light. In one example, a user may create a drawing image 43 in a first color, and return to a selection menu for indicating a second color of light, which may then be added to the initial drawing image 43. As such, the drawing image 43 may include two different colors of light that selectively illuminate different pixel locations corresponding to the strokes of the stylus 12, based on the color that was indicated by the stylus 12 at the time the portion of the drawing image 43 was created.

Control features 20 or functions of the control electronics may provide animation of the created image, movement of the image around the display housing 16, changing colors of the display, or a variety of other enjoyable visual effects associated with the drawing image 43. The control features might also allow the drawing image 43 to be erased, stored, or deleted, among a variety of other functions. In some embodiments, software associated with the control electronics allows the selective illumination of a first set of pixel locations in a first color of light, followed by selective illumination of a second set of pixel locations in a second color of light, such that the drawing image 43 may include multiple colors in a single drawing. In one example, the control electronics processes a variety of commands received from the stylus 12, including indications of selected light colors and indications of drawings of an image on the display housing 16, and coordinates the display of a drawing image 43 with the corresponding markings and colors of light.

Figure 6:
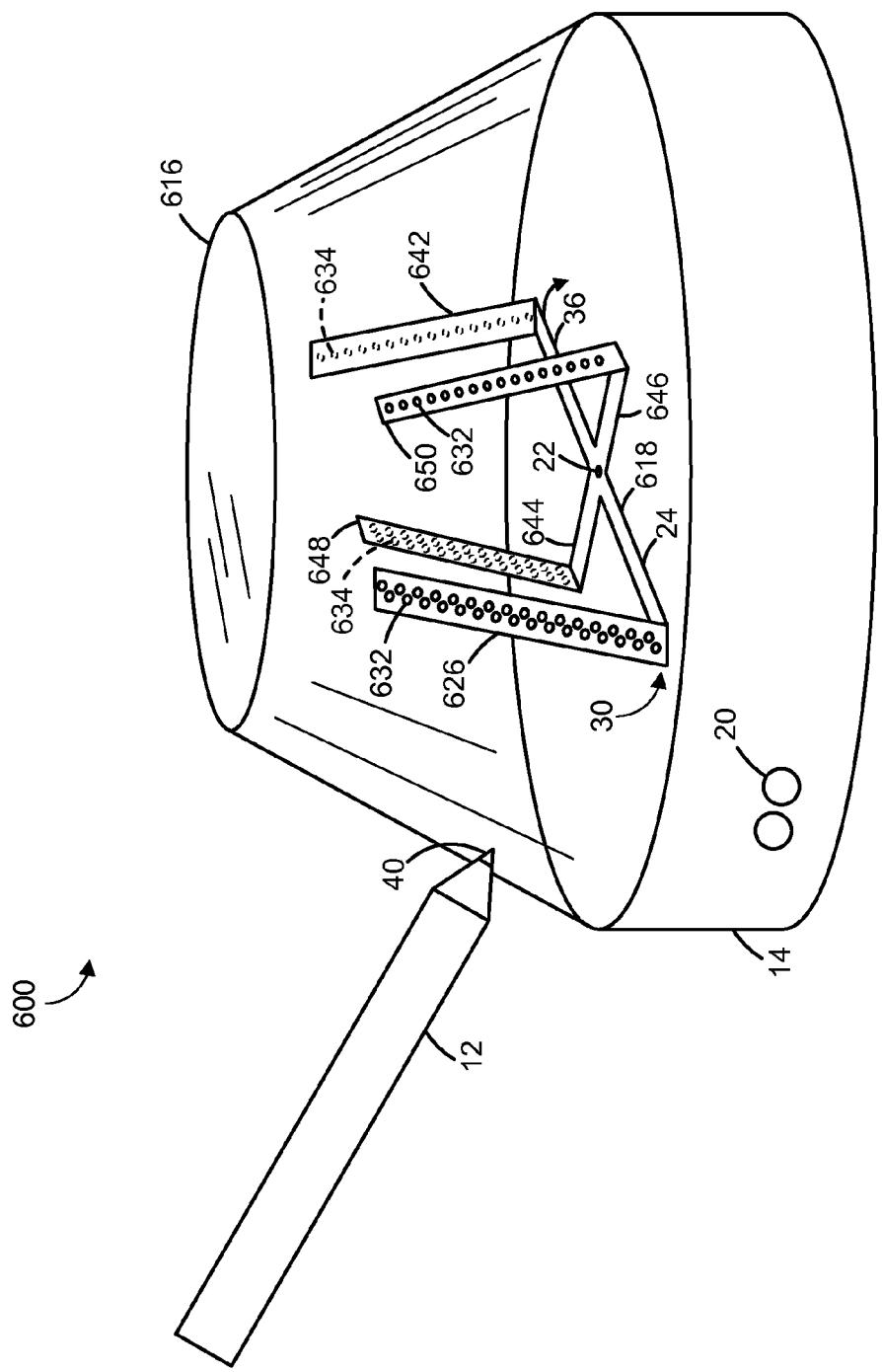
FIG. 6 is a perspective view of a persistence-of-vision display device having a second tier of light sources and sensors radially offset from a first tier of light sources and sensors in accordance with an embodiment of the invention.

In another embodiment, an armature 618 includes a fifth and sixth segment 644, 646 extending radially outward from a central portion of the armature 618, as depicted in FIG. 6. The fifth and sixth segments 644, 646 are shorter in length than the first and third segments 24, 36 and include seventh and eight segments 648, 650, respectively, that depend from distal ends thereof. The seventh segment 648 includes a plurality of light sources 632 and the eighth segment 650 includes a plurality of sensors 634 arranged similarly to the second and fourth segments 626, 642. In an embodiment, the eighth segment 650 is not included and the sensors 634 on the fourth segment 642 are employed to receive inputs for display on by the light sources 632 on the seventh segment 648.

The seventh and eighth segments 648, 650 thus form a second tier of pixel locations interior to a first tier formed by the second and fourth segments 626, 642. In an embodiment, the armature 618 is configured to provide any number of tiers. As such, two or more arrays of pixels can be determined each at a different radial distance from the center of rotation of the armature 618. The pixels might be referred to as volumetric pixels or voxels that are determined within the volume of space swept out by the armature 618. As such, the display device 600 is configured to produce a volumetric or a three-dimensional image using those voxels.

Figure 7:
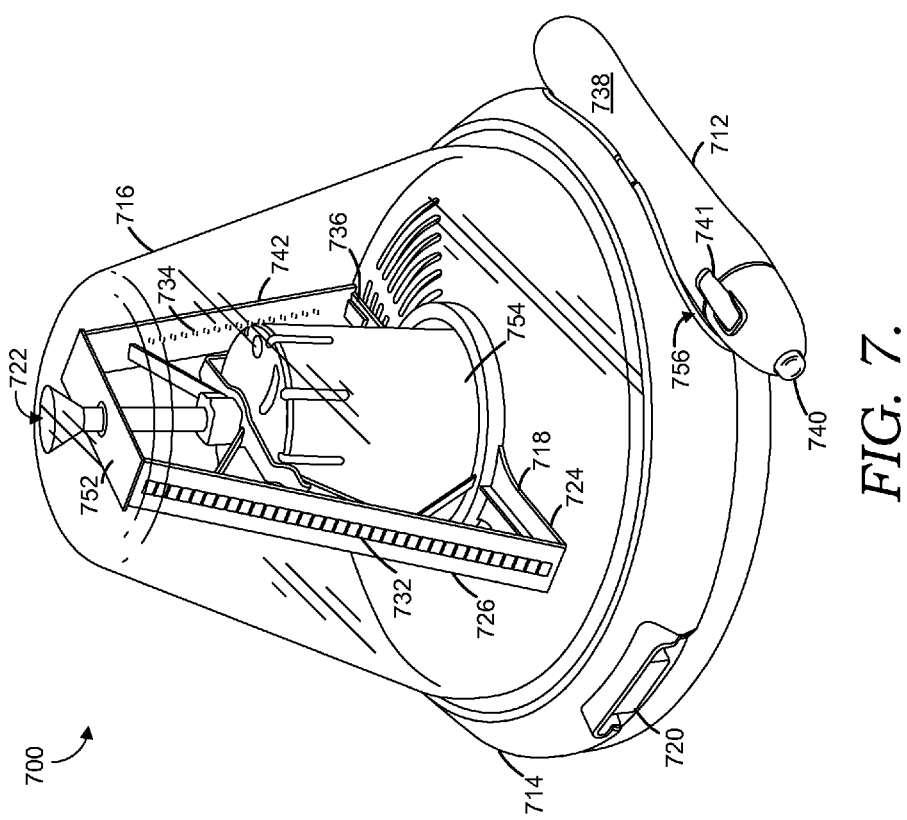
FIG. 7 is a perspective view of a persistence-of-vision display device in accordance with an embodiment of the invention.

Referring next to FIG. 7, one embodiment of a display device 700 includes a stylus storage compartment 756 on a side of the base unit 714. A central compartment 754, coupled to the base unit 714, and may enclose a drive motor, control electronics, a control unit, control features 20, and/or other desired components. For example, a drive motor may be positioned inside central compartment 754 for rotation of second segment 726 and fourth segment 742. Accordingly, in some embodiments, armature 718 includes first segment 724, third segment 736, and top segment 752 that secure the rotation of second segment 726 and fourth segment 742 about the axis of rotation of the shaft 22. In one embodiment, activation of control feature 720 causes rotation of second segment 726 and fourth segment 742, and illumination of an image on a surface of display housing 716 based on light emitted from light sources 732. Additionally, sensors 734 corresponding to light sources 732 may be used to selectively illuminate the light sources 732 at the pixel locations corresponding with the strokes of the stylus 712, to display a created drawing image 43 as shown in FIG. 2.

Figure 8:
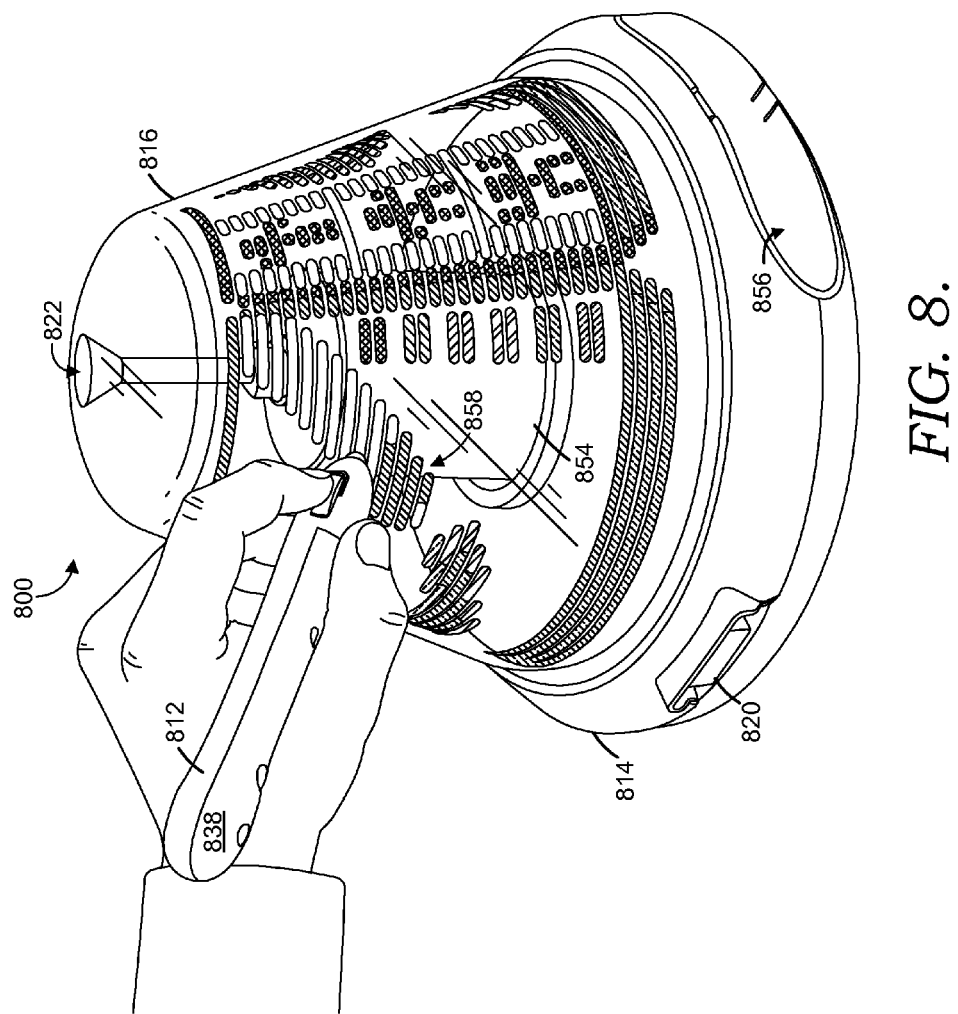
FIG. 8 is a perspective view of the persistence-of-vision display device of FIG. 7 displaying a selection mechanism for input from a stylus in accordance with an embodiment of the invention.

Referring finally to FIG. 8, one embodiment of a display device 800 includes a selection mechanism 858 displayed on a surface of the display housing 816. Selection mechanism 858 may receive a color selection indication (based on where a user points the stylus 812) that is communicated to the control unit to identify a particular color of light for drawing on the display housing 816. In one embodiment, a predetermined image stored in a memory of the control unit (or in a removable memory that is communicatively coupled to the control unit) might be displayed on the display housing 816, providing one or more selection options for a color and/or width of drawing line for creating a drawing image 43. For example, a user may select from one of multiple color options from the illuminated selection mechanism 858 on display housing 816 using the stylus 812. Upon selecting a particular color, a user may draw on the display housing 816 to cause the corresponding pixel locations to illuminate with the selected color of light.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A persistence-of-vision display device comprising:
 a base unit that houses a drive motor;
 a display housing coupled to the base unit and including a transparent or translucent hollow enclosure;
 an armature disposed within the display housing and mechanically coupled to the drive motor, the drive motor rotating the armature about an axis, the armature including a first segment extending radially outward from the axis and a second segment extending at an angle to the first segment and away from the base unit;
 a plurality of light sources disposed along the second segment of the armature;
 a plurality of sensors disposed on the armature; and
 an input stylus configured to provide an input through the display housing to one or more of the plurality of sensors.

2. The persistence-of-vision display device of claim 1, further comprising:
 a control unit disposed within the base unit or on the armature that controls a display generated by one or more of the plurality of light sources and processes the input received via the sensors.

3. The persistence-of-vision display device of claim 1, further comprising:
 one or more of a switch, knob, lever, or button disposed on the base unit and configured to receive a user input.

4. The persistence-of-vision display device of claim 1, wherein the input is a light input and the sensors are photosensors.

5. The persistence-of-vision display device of claim 4, wherein the light input is infrared or ultraviolet light.

6. The persistence-of-vision display device of claim 4, wherein a signal is embedded in the light input.

7. The persistence-of-vision display device of claim 1, wherein a signal emitting portion of the input stylus is in contact with or adjacent to the display housing, the signal passes through the display housing and is received by one or more of the plurality of sensors, and an angular location about the axis at which the signal is received is identified.

8. The persistence-of-vision display device of claim 7, wherein a light source associated with the one or more of the plurality of sensors is illuminated as the rotating armature and the light source pass the angular location.

9. The persistence-of-vision display device of claim 8, wherein inputs are received at a plurality of angular locations and one or more of the plurality of light sources is illuminated at each of the plurality of angular locations to display an image drawn by the input stylus.

10. The persistence-of-vision display device of claim 9, wherein the image is animated.

11. The persistence-of-vision display device of claim 1, wherein the light sources are light emitting diodes that illuminate in one or more colors of visible light.

12. The persistence-of-vision display device of claim 1, wherein the plurality of light sources and the plurality of sensors are aligned in one or more parallel columns along the length of the second segment.

13. The persistence-of-vision display device of claim 1, wherein the armature includes a third segment extending radially outward from the axis and a fourth segment extending at an angle to the third segment and away from the base unit, and wherein the plurality of sensors are disposed along the length of the fourth segment.

14. The persistence-of-vision display device of claim 13, wherein the second and fourth segments are diametrically opposed.

15. A method for generating a persistence-of-vision image display, the method comprising:
  rotating a plurality of sensors disposed on a first segment of an armature, the first segment extending substantially parallel to an axis of rotation of the armature, and the armature being disposed within a display housing;
  providing an input to one or more of the sensors via an input stylus;
  identifying an angular location about the axis of rotation at which the input is received;
  identifying a light source disposed on the armature that corresponds with the one or more sensors that received the input;
  illuminating the light source at the angular location.

16. The method of claim 15, wherein a plurality of inputs are received that form a drawing, and wherein the drawing is subsequently animated.

17. The method of claim 15, wherein the input stylus is adjacent to or in contact with the display housing.

18. A persistence-of-vision display device comprising:
  a base unit that houses a drive motor;
  a display housing coupled to the base unit and including a transparent or translucent hollow enclosure;
  an armature disposed within the display housing and mechanically coupled to the drive motor, the drive motor rotating the armature about an axis, the armature including a first segment extending radially outward from the axis and a second segment extending at an angle to the first segment and away from the base unit;
  a plurality of light sources disposed along the second segment of the armature;
  a plurality of sensors disposed on the armature;
  an input stylus configured to provide an input through the display housing to one or more of the plurality of sensors, wherein when a signal-emitting portion of the input stylus is in contact with or adjacent to the display housing, a signal passes through the display housing and is received by one or more of the plurality of sensors, wherein an angular location about the axis at which the signal is received is identified; and
  a control unit disposed within the base unit or on the armature that controls a display generated by the light sources and processes the input received via the sensors.

19. The persistence-of-vision display device of claim 18, wherein a light source associated with the one or more of the plurality of sensors is illuminated as the rotating armature and the light source pass the angular location, and further wherein inputs are received at a plurality of angular locations and one or more of the plurality of light sources is illuminated at each of the plurality of angular locations to display an image drawn by the input stylus.

20. The persistence-of-vision display device of claim 18, wherein processing the input received via the sensors comprises processing an indication of a color selection from a plurality of color selection options.

* * * * *